United States Patent
Boldyrev et al.

(10) Patent No.: US 9,355,144 B2
(45) Date of Patent: May 31, 2016

(54) METHOD AND APPARATUS FOR RECYCLING INFORMATION FRAGMENTS IN INFORMATION SPACES

(75) Inventors: Sergey Boldyrev, Söderkulla (FI); Ian Oliver, Söderkulla (FI); Jukka Honkola, Espoo (FI); Ronald Brown, Helsinki (FI); Olli Tyrkko, Espoo (FI); Vesa Luukkala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1811 days.

(21) Appl. No.: 12/635,473

(22) Filed: Dec. 10, 2009

(65) Prior Publication Data

US 2011/0145303 A1 Jun. 16, 2011

(51) Int. Cl.
*G06F 17/30* (2006.01)

(52) U.S. Cl.
CPC .............................. *G06F 17/30433* (2013.01)

(58) Field of Classification Search
USPC ......................................................... 707/812
See application file for complete search history.

(56) References Cited

U.S. PATENT DOCUMENTS

| | | | |
|---|---|---|---|
| 6,044,398 A | 3/2000 | Marullo et al. | |
| 7,773,599 B1* | 8/2010 | Lim et al. | 370/392 |
| 8,019,811 B1* | 9/2011 | Britto et al. | 709/203 |
| 2002/0104077 A1* | 8/2002 | Charnell et al. | 717/162 |
| 2003/0193994 A1* | 10/2003 | Stickler | 375/150 |
| 2005/0090591 A1* | 4/2005 | Heidenfelder et al. | 524/315 |
| 2007/0104220 A1* | 5/2007 | Charlebois | 370/466 |
| 2009/0024357 A1* | 1/2009 | Aso | B60W 30/10 702/181 |
| 2009/0034357 A1* | 2/2009 | Gramann et al. | 366/77 |
| 2009/0327277 A1 | 12/2009 | Sanborn et al. | |
| 2010/0027845 A1* | 2/2010 | Kim et al. | 382/107 |

FOREIGN PATENT DOCUMENTS

WO   WO 2007062293 A2   5/2007

OTHER PUBLICATIONS

Aberer, K. et al., Emergent semantic principles and issues, In Procceedings of the 9th International Conference on Database Systems for Advanced Applications (DASFAA 2004). Accessed: Apr. 2, 2010, http://people.csail.mit.edu/pcm/papers/DASFAA2004.pdf. pp. 1-14.

(Continued)

*Primary Examiner* — Belix M Ortiz Ditren
(74) *Attorney, Agent, or Firm* — Alston & Bird LLP

(57) ABSTRACT

An approach is provided for recycling information fragments in information spaces. An information management system detects a plurality of information management processes occurring in an information space. The information management processes retrieve one or more information fragments from the information space. The information management system then determines a sequence of states for each of the plurality of information management processes over a period of time and calculates a state trajectory from each of the sequence of states. The calculated state trajectories are used to predict a finite set of possible future states. The information management system uses the prediction to determine which of the one or more information fragments are recyclable and preserves the recyclable information fragments for responding to a subsequent request directed to the information space.

18 Claims, 10 Drawing Sheets

(56) References Cited

OTHER PUBLICATIONS

Andreyev, Yu. V. et al., Information Processing in Nonlinear Systems with Dynamic Chaos, Proceedings of International Seminar on Nonlinear Circuits and Systems, Moscow, Russia, Jun. 16-18, 1992, vol. 1, pp. 51-60.
Berlekamp E., Factoring polynomials over large finite fields, Mathematics of Computation, vol. 24, No. 111, pp. 713-735, Jul. 1970.
Carroll, J. et al., "Named Graphs, Provenance and Trust", HP technical report 2004.
Ding, L. et al., "Tracking RDF Graph Provenance using RDF Molecules", Proceedings of the 4th International Semantic Web Conference, Nov. 2005.
Dubois, D. et al. On the use of aggregation operations in information fusion processes. Fuzzy Sets and Systems. 142, pp. 143-161, 2004.
Dubois, D. et al., Ordinal and probabilistic representations of acceptance. J. Artificial Intelligence Research, 22, 23-56, 2004.
Grigor'ev, D. Yu., Two reductions of graph isomorphism to problems on polynomials. Translated from Zapiski Nauchnykh Seminarov Leningradskogo Otdeleniya Matematicheskogo Instituta im. V. A. Steklova AN SSSR, vol. 88, pp. 56-61, 1979.
Lassila, O., "Taking the RDF Model Theory Out for a Spin", in: Ian Horrocks & James Hendler (eds.): "The Semantic Web—ISWC 2002", Lecture Notes in Computer Science 2342, pp. 307-317, Springer Verlag, 2002.
M. Rabin, Efficient Dispersal of Information for Security, Load Balancing, and Fault Tolerance, Journal of the ACM, vol. 36(2), pp. 335-348, 1989.
Rabin M., Probablistic algorithms in finite fields, SIAM Journal on Computing, vol. 9, No. 2, 1980, pp. 273-280.
Shoup, V., New algorithms for finding irreducible polynomials over finite fields, Mathematics of Computation 54:435-447, 1990; extended abstract in Proc. 29th Annual Symposium on Foundations of Computer Science, pp. 283-290, 1988.
Shoup, V., On the deterministic complexity of factoring polynomials over finite fields, Computer Science Technical Report No. 782, University of Wisconsin-Madison, pp. 1-10, Feb. 21, 1989.
Thiran, P. et al., Information processing using stable and unstable oscillations: a tutorial, CNNA-94 3rd IEEE Int. Workshop on Cellular Neural Networks and their Applications: 127-136. Dec. 18-21, 1994.
Tummarello, G. et al. "Signing individual fragments of an RDF graph", 14th International World Wide Web Conference WWW2005, Poster track, May 2005, Chiba, Japan J. Carroll, "Signing RDF graphs", HP technical report 2003.
U.S. Appl. No. 12/144,726, filed Jun. 24, 2008, Boldyrev et al.
U.S. Appl. No. 12/329,217, filed Dec. 5, 2008, Boldyrev et al.
U.S. Appl. No. 12/347,018, filed Dec. 31, 2008, Boldyrev et al.

\* cited by examiner

500

METHOD AND APPARATUS FOR RECYCLING INFORMATION FRAGMENTS IN INFORMATION SPACES

BACKGROUND

Mobile devices with various methods of connectivity are now for many people becoming the primary gateway to the internet and also a major storage point for personal information. This is in addition to the normal range of personal computers, servers, applications, services, and the like that cater to information storage and processing. As part of this trend, service providers and device manufacturers are combining and providing interoperability among these myriad information processing devices, applications, and services. More specifically, one area of development has been the processing of information through numerous, individual and personal spaces in which persons, groups of persons, etc. can place, share, interact and manipulate webs of information with their own locally agreed semantics without necessarily conforming to an unobtainable, global whole. These information spaces, often referred to as smart spaces, are projections of the 'Giant Global Graph' in which one can apply semantics and reasoning at a local level. In one embodiment, information spaces are made of distributed components of information which are stored, maintained and processed in different forms by systems having different architectures and using different technologies. Additionally, in some scenarios, such as when there are network connectivity issues, a participant performing a query for information from the information spaces may lose connection while the result to the query is being calculated. Therefore even though considerable amount of resources may be utilized for result calculation, the results may not reach the requesting participant.

Some Example Embodiments

Therefore, there is a need for an approach for recycling pre-processed or aggregated fragments of information in order to serve other queries.

According to one embodiment, a method comprises detecting a plurality of information management processes occurring in an information space. The information management processes retrieve one or more information fragments from the information space. The method also comprises determining a sequence of states for each of the plurality of information management processes over a period of time. The method further comprises calculating a state trajectory from each of the sequences of states. The method further comprises predicting a finite set of possible future states based on the calculated state trajectories. The method further comprises determining which of the one or more information fragments are recyclable based on the prediction. The method further comprises preserving the recyclable information fragments for responding to a subsequent request directed to the information space.

According to another embodiment, an apparatus comprising at least one processor, and at least one memory including computer program code, the at least one memory and the computer program code configured to, with the at least one processor, cause, at least in part, the apparatus to detect a plurality of information management processes occurring in an information space. The information management processes retrieve one or more information fragments from the information space. The apparatus is also caused to determine a sequence of states for each of the plurality of information management processes over a period of time. The apparatus is further caused to calculate a state trajectory from each of the sequences of states. The apparatus is further caused to predict a finite set of possible future states based on the calculated state trajectories. The apparatus is further caused to determine which of the one or more information fragments are recyclable based on the prediction. The apparatus is further caused to preserve the recyclable information fragments for responding to a subsequent request directed to the information space.

According to another embodiment, a computer-readable storage medium carrying one or more sequences of one or more instructions which, when executed by one or more processors, cause, at least in part, an apparatus to detect a plurality of information management processes occurring in an information space. The information management processes retrieve one or more information fragments from the information space. The apparatus is also caused to determine a sequence of states for each of the plurality of information management processes over a period of time. The apparatus is further caused to calculate a state trajectory from each of the sequences of states. The apparatus is further caused to predict a finite set of possible future states based on the calculated state trajectories. The apparatus is further caused to determine which of the one or more information fragments are recyclable based on the prediction. The apparatus is further caused to preserve the recyclable information fragments for responding to a subsequent request directed to the information space.

According to another embodiment, an apparatus comprises means for determining a sequence of states for each of the plurality of information management processes over a period of time. The information management processes retrieve one or more information fragments from the information space. The apparatus also comprises means for calculating a state trajectory from each of the sequences of states. The apparatus further comprises means for predicting a finite set of possible future states based on the calculated state trajectories. The apparatus further comprises means for determining which of the one or more information fragments are recyclable based on the prediction. The apparatus further comprises means for preserving the recyclable information fragments for responding to a subsequent request directed to the information space.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for recycling information fragments in information spaces are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
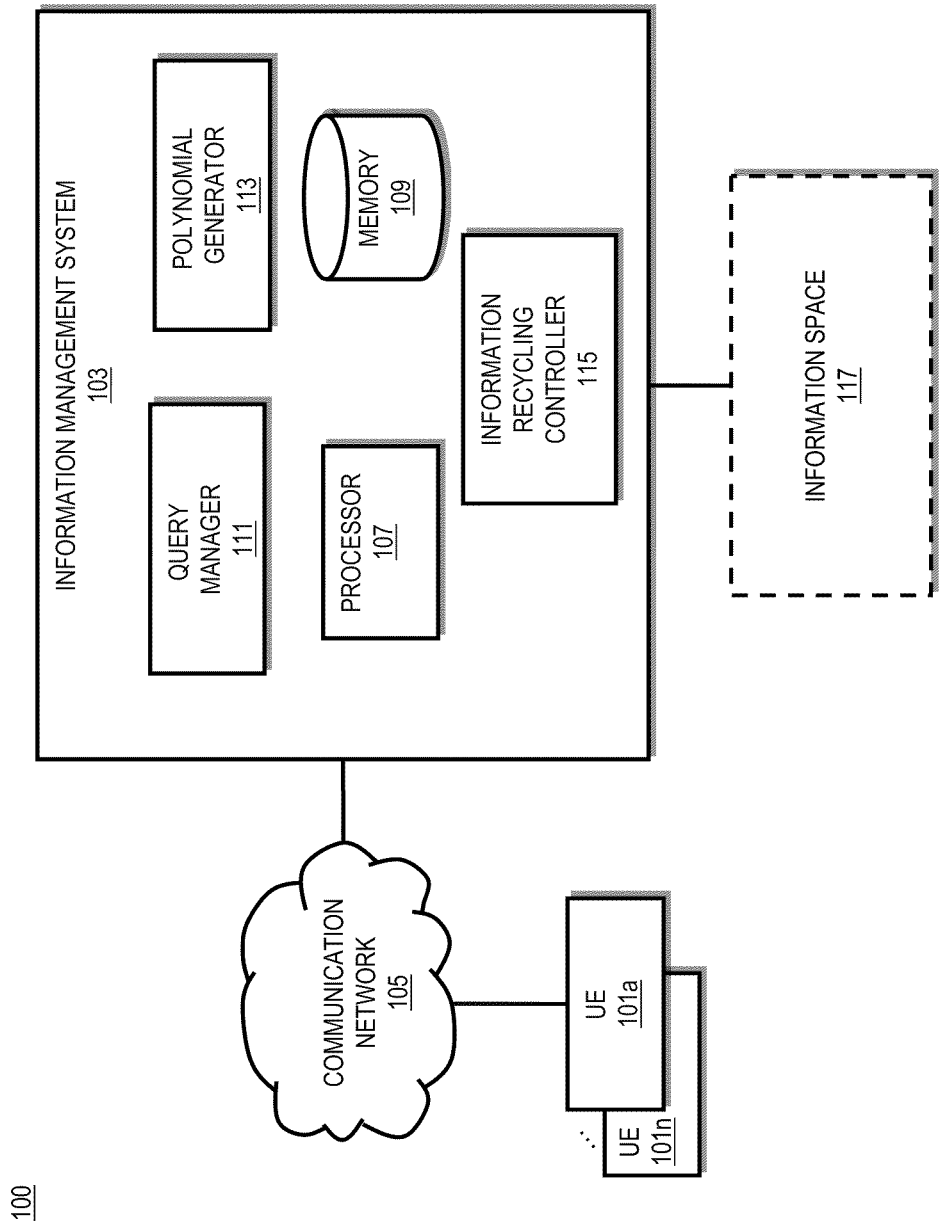
FIG. 1A is a diagram of a system capable of recycling information fragments in information spaces, according to one embodiment.

FIG. 1 is a diagram of a system capable of recycling information fragments in information spaces, according to one embodiment. An information space is made up of one or more information stores. Since information stores may be implemented by any device that is connected to the information space, the data of the information space may be distributed or dispersed within the information space amongst the information stores. In this regard, data within the information space may be acted upon by a dispersion algorithm. Any known dispersion algorithm may be utilized to disperse data (e.g., partial data closures, data signatures, etc.) among the information stores of an information space. The dispersion algorithm may also be used to decompose a data set into partial closures and the partial closures may be dispersed within the information space. The partial closures may be transformed or synthesized into irreducible polynomial expressions of a desired degree, or data signatures, using a factoring algorithm or other mathematical techniques (e.g., cyclotomic polynomial extensions) within data storage environments, such as communications networks.

The participants or actors within an information space environment (sometimes referred to as nodes) are entities that request or interact with data, for example through the use of queries. The querying process for information spaces is described in more detail in U.S. patent application Ser. No. 12/569,152 filed Sep. 9, 2009 entitled "Method and Apparatus for Creating and Utilizing Information Representation of Queries," the entirety of which is incorporated herein by reference. In one embodiment, a query may be received that identifies data (e.g., local data) for generating a partial closure. These data signatures may be considered a relatively lighter version of the partial closures due to the data signatures being smaller in size than the respective partial closures. In some exemplary embodiments, the data signatures are smaller is size because redundant data is eliminated. The data signatures may be stored in the information stores of the information space to facilitate satisfying subsequent queries.

However, because of the distributed nature of information spaces, on some occasions the requesting node may lose connectivity to the information system while the answer to the request has been partially processed. Query processing in a distributed environment can be very expensive in the sense that it may require extensive use of resources such as network time and bandwidth. Often times, the requesting node may regain connectivity to the network and repeat the request to the information space or other nodes may send requests which can benefit from the previously prepared fragments of information.

To address this problem, a system 100 of FIG. 1 introduces the capability to preserve pre-processed fragments of information for further use in order to avoid repetitive processes for recalculating the fragments. The system uses request processing history and patterns of processing activities in order to predict whether an information fragment may be required in a near future and if so preserve it for further use.

As shown in FIG. 1, the system 100 comprises user equipment (UEs) 101a-101n having connectivity to an information management system 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UEs 101a-101n is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UEs 101a-101n can support any type of interface to the user (such as "wearable" circuitry, etc.).

The information management system 103 in FIG. 1 is configured for polynomial-based data transformation and utilization according to various embodiments of the present invention. The information management system 103 and in particular the processor 107, may be configured to implement operations such as generation and dispersion of irreducible polynomials or data signatures, handling of a query for the retrieval of information or controlling the recycling process of information fragments.

In some embodiments, the information management system 103 may be included as a component of, a computing device and/or a communications device with wired or wireless communications capabilities. Some examples of the information management system 103 include a computer, a server, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, a network entity such as an access point such as a base station, or any combination thereof. Further, the information management system 103 may be configured to implement various aspects of the present invention as described herein including, for example, various example methods of the present invention, where the methods may be implemented by means of a hardware and/or software configured processor (e.g., processor 107), a computer-readable medium, or the like.

The information management system 103 may include or otherwise be in communication with a processor 107 and a memory device 109. The processor 107 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. With respect to the processor being an FPGA, ASIC, or the like, the processor may be specifically hardware configured to perform the operations of the processor 107 as described herein. In an example embodiment, the processor 107 is configured to execute instructions stored in the memory device 109 or instructions otherwise accessible to the processor 107.

The memory device 109 may be configured to store various information involved in implementing embodiments of the present invention such as, for example, determining recyclable information fragments. The memory device 109 may be a computer-readable storage medium that may include volatile and/or non-volatile memory. For example, memory device 109 may include Random Access Memory (RAM) including dynamic and/or static RAM, on-chip or off-chip cache memory, and/or the like. Further, memory device 109 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 109 may include a cache area for temporary storage of data. In this regard, some or all of memory device 109 may be included within the processor 107.

Furthermore, the memory device 109 may be configured to store information, data, applications, computer-readable program code instructions, or the like for enabling the processor 107 and the information management system 103 to carry out various functions in accordance with example embodiments of the present invention. For example, the memory device 109 could be configured to store recyclable information fragments. Additionally, or alternatively, the memory device 109 may be configured to store instructions for execution by the processor 107.

The query manager 111, the polynomial generator 113 and information recycling controller 115 of information management system 103 may be any means or device embodied in hardware, a computer program product, or a combination of hardware and software, such as processor 107 implementing software instructions or a hardware configured processor 107, that is configured to carry out the functions of the query manager 111, the polynomial generator 113 and the information recycling controller 115 as described herein. In an example embodiment, the processor 107 may include, or otherwise control the query manager 111, the polynomial generator 113 and the information recycling controller 115. In various example embodiments, the query manager 111, the polynomial generator 113 and the information recycling controller 115 may reside on differing apparatuses such that some or all of the functionality of the query manager 111, the polynomial generator 113 and the information recycling controller 115 may be performed by a first apparatus, and the remainder of the functionality of the query manager 111, the polynomial generator 113 and the information recycling controller 115 may be performed by one or more other apparatuses.

The query manager 111 may be configured to identify data that is relevant to a set of one or more queries. In this regard, the identified data may be identified and located in a memory device accessible via the network 105 or the identified and located data may be stored in the memory device 109. The query manager 111 may also be configured to generate an information source vector. The information source vector may be defined so as to indicate information sources associated with the data that are relevant to the set of queries. In some example embodiments, the query manager 111 may be configured to perform a verification of the information source vector by generating an equivalence class.

The polynomial generator 113 may be configured to generate a cyclotomic polynomial based on an information source vector. Further, the polynomial generator 113 may be configured to factor the cyclotomic polynomial to generate a plurality of orthogonal data signatures. Further, in some example embodiments, the polynomial generator 113 may also be configured to factor the cyclotomic polynomial to generate the plurality of orthogonal data signatures, where the orthogonal data signatures are irreducible polynomials. In some example embodiments, the polynomial generator 113 may also be configured to update the orthogonal data signatures by factoring a new cyclotomic polynomial generated based on updated data.

The information recycling controller 115 may be configured to detect one or more information management processes and collect statistics about the states of one or more information management processes retrieving information from the information space 117 in response to a query received by the query manager 111. The information recycling controller 115 uses the collected statistics to predict future states of the one or more information management processes in order to identify the recyclable fragments of information which have been retrieved from the information space 117 by the information management processes.

Figure 1B:
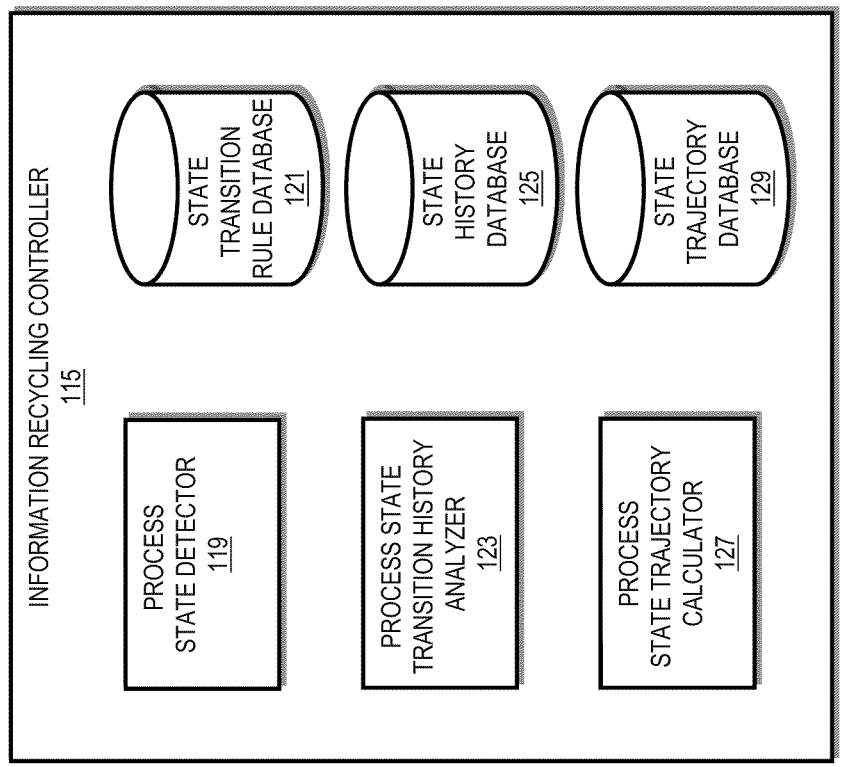
FIG. 1B is a diagram of an information recycling controller component, according to one embodiment.

FIG. 1B is a diagram of an information recycling controller component, according to one embodiment. The process state detector 119 determines the state of a process at any moment of time. The state of a process can be described by two opposite states as active and inactive. For example, in the case of information semantics, the state space (or a set of possible states) consists of all local communication states reached in consensus building. In-between states may be defined as transitional uncertain process states. Therefore, information management process can be inherently characterized by either of the two opposite states in the following way. An inactive state of information management process can be assumed to be characterized by non-involvement in any activity (e.g. deducing information, fetching or storing). The inactive state of information process is a fault-free state during which the system is totally disconnected from the outside world and thus can be assumed stable. It is noted that this state is theoretically possible only at each particular, separately considered moment. An information management process performing any sustained operation may be assumed to operate in its active state.

The process state detector 119 refers to the state transition rule database 121 for constraints and conditions that have been predetermined for changing the state of a process. The state transition rule database 121 is a collection of regulatory or semantic rules for controlling state transition of various processes. These rules may be identified by information owner(s), network authorities, system standards, or any external entity that can use a particular information management process. The transition rules determine direction of state transmission for each process of the information management system.

The state transition history database 125 is a collection of past state transitions for each process and can be used for creating state trajectory. The process state transition history analyzer 123 performs various statistical analyses on the history collected in history database 125 and determines trends and patterns of state transition over periods of time. For example, an analysis by the state transition history analyzer 123 may conclude that from a certain point in time the song title sort process has become almost inactive most of the time The process state trajectory calculator 127 determines a state trajectory or a basic pattern (attractor) that state transition revolves around it for each process, using the state transition rule database 121 and the analysis results from the state transition history analyzer 123. In the above example, the state trajectory calculator 127 may use the results from analysis by state transition history analyzer 123 and may also refer to the state transition rule database 121 and conclude that the reason for sort process inactivity is that the music producer M applied a constraint to prevent a reshuffling program (that utilizes sort process) from accessing its customers' music collections. The state trajectory calculator 127 uses this conclusion to update the state trajectory for sort process into a new trajectory taking into account that sort process is not being used by reshuffling program for producer M's customers.

The calculated state trajectories are stored in the state trajectory database 129 to be used for prediction of future process states for the purpose of identifying recyclable information by the information recycling controller 115. Regarding the above example, if the information recycling controller 115 is to determine recyclability of an information fragment retrieved from producer M's customer data that would have been normally used by sort process, the information recycling controller 115 may refer to the state trajectory for sort process in state trajectory database 129 and conclude that the retrieved information fragment is not recyclable and can be discarded.

In one embodiment, the process state trajectory calculator 127 may also detect effects that state transition of one or more processes may have on other processes' state transitions.

Figure 2:
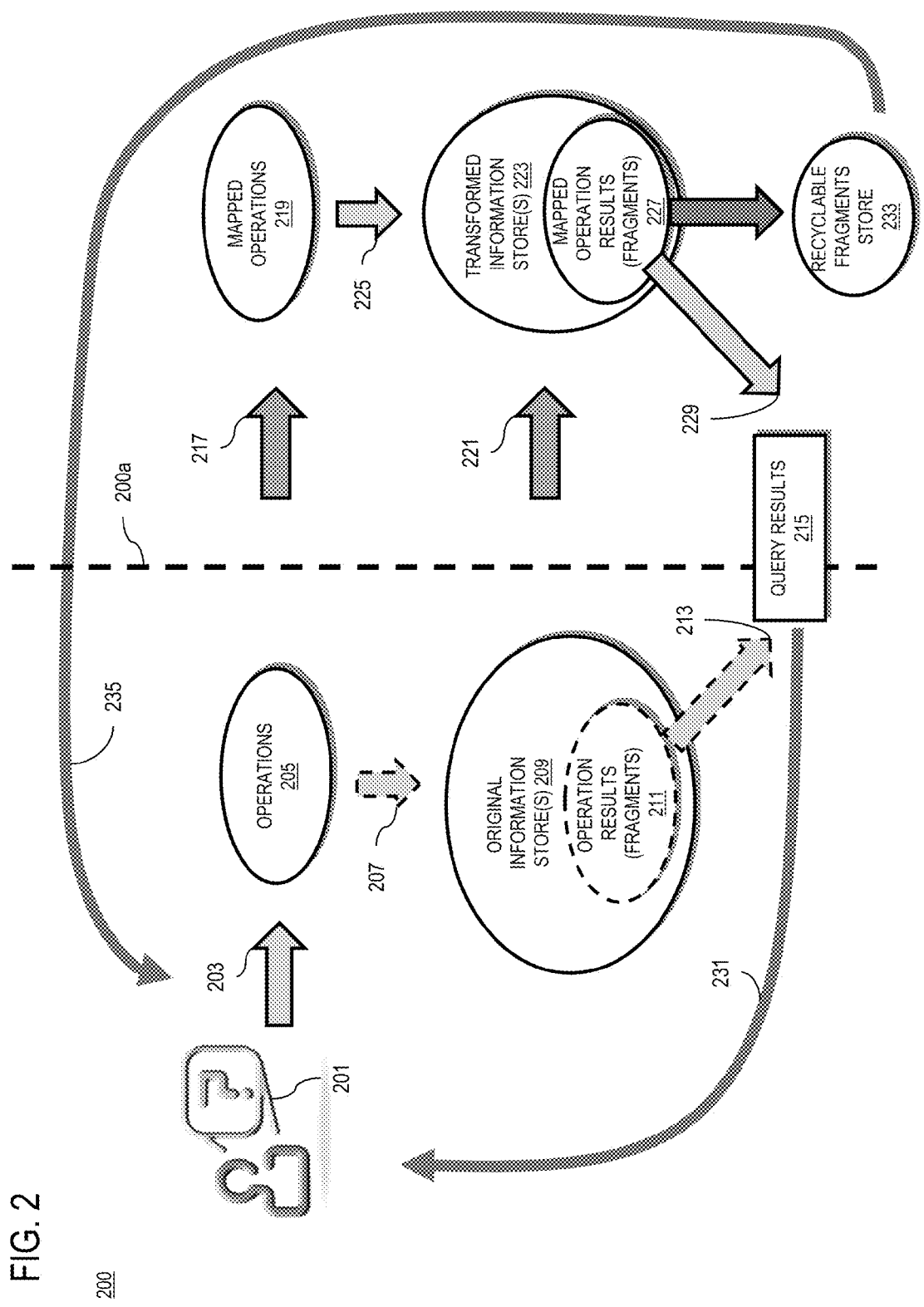
FIG. 2 is a diagram of processes of an information management system, according to one embodiment.

FIG. 2 is a diagram of processes of an information management system, according to one embodiment. The process starts with step 201 where a UE or any component (not shown) having connectivity to an information space via the communication network 105 request information from the information space. In one embodiment, step 203 represents initial process by a query manager 111 from an information management system 103 in order to identify a relevant subset of data. During process 203, the query manager 111 also identifies a sequence of operations 205 that can be applied on relevant data to produce the information requested by the query. As shown, the components located on the left side of vertical line 200a represent the original operations and the original information store of the information space that traditionally (in the absence of data signatures) would have been used for retrieving the requested information through a query from the information space. In such circumstances, after the process 203 identifies the sequence of required operations 205, the processor 107 from the information management system 103 utilizes process 207 on the sequence of operations 205 on the information contents from information store 209. As a result, a subset of information as information fragments 211 is retrieved from information stores 209 as preliminary fragments of information towards an answer to query 201. The information fragments 211 are partial data closures (partial closures) that satisfy requested conditions and the original data set, or a reliable prediction of the original data set, may be generated from two or more of the partial closures. The information fragments 211 are further processed, combined and refined by processor 107 utilizing process 213 and results 215 to query 201 are produced. After information fragments are ready, the query manager 111 activates process 213 to combine the retrieved fragments 211 into results 215. Process 231 from query manager 111 sends the results to the requesting entity.

In one embodiment of the present invention, the polynomial generator 113 utilizes processor 107 and executes process 217 where the set of operations 205 are mapped into a new set of operations 219. The mapping from operations 205 into operations 219 is isomorphic in the sense that it is exact mapping from operations 205 and all the restrictions and conditions applied to operations 205 will apply to mapped operations 219 in exact same way.

Similarly, the polynomial generator 113 utilizes processor 107 to execute process 221 that transforms contents of information store 209 into irreducible polynomials of desired degrees (or data signatures) and stores the polynomials in the transformed information store 223. The polynomial generator 113 uses previously synthesized polynomials to transform (or slice) information contents of the original information store 209 into polynomials in transformed information store 223. In one embodiment, induction of polynomials is conducted using a factoring algorithm or other mathematical techniques (e.g., cyclotomic polynomial extensions)

In some example embodiments, an Information Dispersal Algorithm (IDA) may be used to decompose a data set into partial closures (also known as partial data closures) and the partial closures may be dispersed throughout the information space. According to various example embodiments, the original data set, or a reliable prediction of the original data set, may be generated from two or more partial closures. An Information Dispersal Algorithm (IDA) is a method to split a file f into n pieces in such a way that the file f can be reconstructed from some predefined subsets of pieces n. Information dispersal algorithms have different applications such as secure and reliable information storage, fault-tolerant and efficient transmission of information in distributed systems, and communications between processors in parallel computers.

In step 225 the query manager 111 applies mapped operations 219 on the transformed information store 223 to create a subset of transformed information 227 which includes results of the mapped operation. These polynomials or data signatures 227 may be considered a relatively lighter version of the partial closures or fragments 211 due to the data signatures being smaller in size than the respective partial closures. In some exemplary embodiments, the data signatures are smaller is size because redundant data is eliminated. The data signatures retain sufficient information so as to allow the data signatures to be used for querying functionality.

The process of step 229 is similar to step 213 with the difference that in step 229 the data signatures are converted back into information form before being sent as results 215 to the requesting entity.

In one embodiment the data signatures 227 may be stored in a recyclable fragments store 233 to facilitate satisfying subsequent queries. The generated data signatures, according to various example embodiments, facilitate efficient information transformation, dissemination and aggregation in the presence of distributed and partial information. In some situations such as network fault, device failure, etc. the requesting entity 101 may lose connectivity to the information management system 103 after sending the request 201. At some point during the process of retrieving request results from the information space 117 the information management system 103 may receive information that the requesting entity is not available anymore. In such case, part (or all) of the information fragments required for answering the request may have already been retrieved. However, processing the final results is not needed anymore since the requesting entity will not be able to receive the results.

In one embodiment the information management system 103 stores the already provided fragments in a recyclable fragments store 233 for future use. However, since storing all the fragments will need extensive memory and processing time, the information management system 103 uses a decision strategy as to which fragments are more likely to be reused in the near future and, therefore, storing them will be beneficial.

Figure 3:
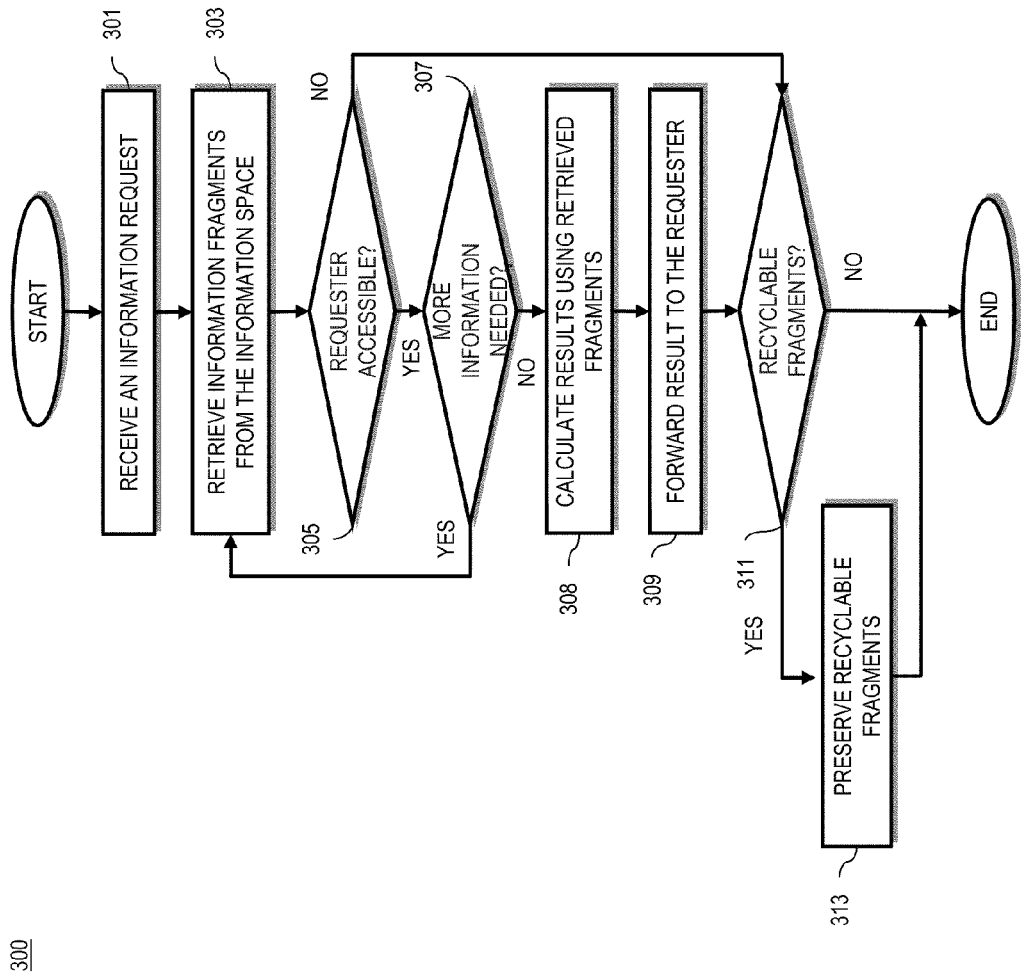
FIG. 3 is a flowchart of a process for recycling information fragments in information spaces, according to one embodiment.

FIG. 3 is a flowchart of a process for recycling information fragments in information spaces, according to one embodiment. In one embodiment, the information management system 103 performs the process 300 and is implemented in, for instance, a chip set including a processor and a memory as shown FIG. 8. The process starts with step 301 where a UE or any component (not shown) having connectivity to an information space via the communication network 105 requests information from the information space. This request is received by the information management system 103. In step 303, the information management system 103 retrieves fragments of information from information space required in order to answer the received request, as explained in FIG. 2. In step 305, the information management system 103 checks whether the requesting entity still has connectivity with the network. If for any reason, such as network issues, the requesting entity has lost connectivity, the process continues from step 311 where the information recycling controller 115 predicts whether the information fragments retrieved so far are recyclable and need to be preserved. The process of recyclability prediction is discussed in more detail in FIG. 4. In step 313, the fragments that have been evaluated as recyclable are preserved in memory 109. However, if in step 305 the information management system 103 concludes that the requesting entity is still connected to the network, the information management system 103 checks whether all the pieces of information needed for answering the request have been retrieved per step 307. If more information is required, the process of information retrieval of step 303 is repeated until all information is collected. However, at every stage after a new set of fragments is collected, the information management system 103 checks whether the requesting entity is still available. In this case, if for any reason the requesting entity has lost contact or the request has been cancelled or withdrawn, the process of answer preparation will be terminated and the fragments retrieved so far are evaluated for recyclability.

If in step 307 the information management system 103 concludes that all the required fragments of information are ready, the query manager 111 calculates the final answer to the request (step 308). In step 309, the information management system 103 forwards the calculated answer to the requesting entity. However, also in this case, before the collected information fragments are discarded, the information recycling controller 115 can determine the recyclability of the fragments per step 311 and preserve the recyclable fragments in memory 109 per step 313.

Recyclability of information fragments is determined based on prediction of a sequence of future states of information management processes. In order for the future states to be predicted, a sequence of past states (history) is collected and analyzed. The analysis can reveal trends and patterns in the system processes which can be utilized for predicting possible future trends and patterns of status change. The predicted future trends can then be used for determining recyclability of information fragments that can be reutilized in the future.

Figure 4:
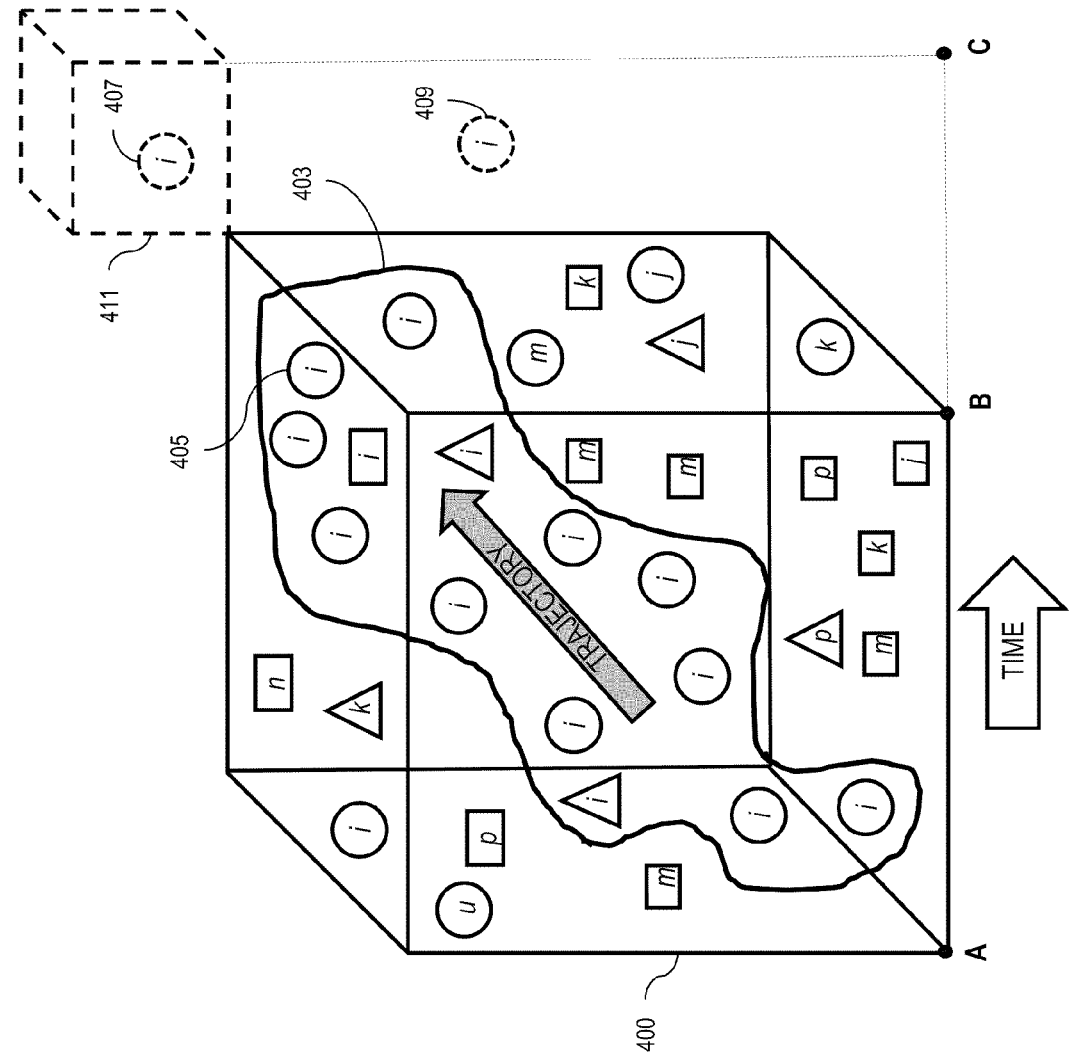
FIG. 4 is a diagram of state trajectory for information management processes, according to one embodiment.

FIG. 4 is a diagram of state trajectory for a sequence of information management processes, according to one embodiment. The information management system 103 may keep a sequence of states for each of a plurality of information management processes, over a period of time from time A to time B. Cube 400 in FIG. 4 represents a three dimensional space consisting of information management processes i, j, k, m, n, p, . . . and their states during a time period from A to B. It is contemplated that the approach described herein is applicable to any multi-dimensional space. In FIG. 4, active states of processes are shown with circles, inactive states are shown with squares, and transitional states are shown with triangles. A sequence of the consecutive states of a process can be used describe any evolving behavior of an intelligent information management process in non-monotonic case as an infinite set of inactive (stable), active (unstable) and transition (uncertain) states.

By extending the definitions of the states, the intelligent information management process is represented as a particular model that follows a certain type of state trajectory (or attractor) in a multidimensional state space that is sampled by means of stable and unstable states. An attractor is a set to which a dynamic system evolves after a long enough time. That is, points that get close enough to the attractor remain close even if slightly disturbed. A trajectory of the dynamical system in the attractor does not have to satisfy any special constraints except for remaining on the attractor.

As seen in FIG. 4, the space within the closed line 403 represents a trajectory of active states (circles) for information management process i between time points A and B. The information management system 103 may predict a finite set 411 of future states (between time point B and time point C) for process i based on the calculated trajectory 403.

In an exemplary embodiment, assuming that circle 405 represents the last state of process i before time point B, based on state trajectory 403 from possible next states 407 and 409, state 407 will be the more likely to happen because it is within the range of predicted future states. Therefore, in order to determine recyclability of an information fragment F (not shown), the information management system 103 checks the recyclability of the information fragment F for all the relevant information management processes until at least one (or a predefined number) of processes are found that may be able to reutilize the information fragment F in the near future. Assuming that process i is a relevant process for the information fragment F and predicted state 407 can benefit from the information fragment F, then the information fragment F can be determined as recyclable for process i. Otherwise, if the information fragment F is determined to be reusable for a state (such as 409 which is too far off from the predicted future states for process i), then the information management system 103 may identify information fragment F as nonrecyclable for process i since the probability of it being reused within time frame B to C is low.

Figure 5:
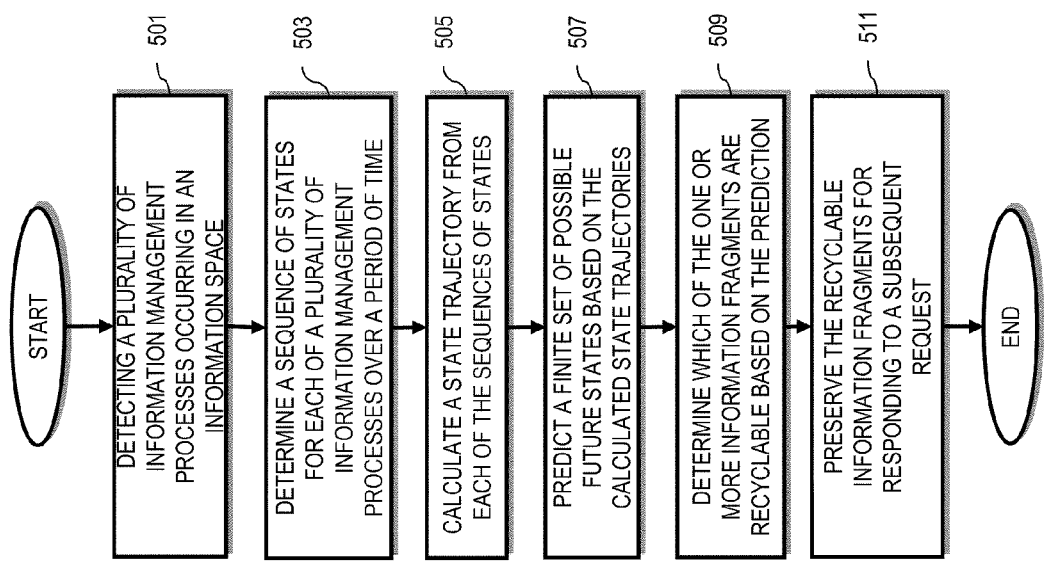
FIG. 5 is a flowchart of a process for predicting recyclability of information fragments, according to one embodiment.

FIG. 5 is a flowchart of a process for predicting recyclability of information fragments, according to one embodiment. In one embodiment, the information management system 103 performs the process 500 and is implemented in, for instance, a chip set including a processor and a memory as shown FIG. 8. As per step 501, the information management system 103 determines a set of processes that are performed during data management. These processes may include various functions such as searching, reading, writing, updating, merging or splitting of information. In step 503, the information recycling controller 115 of the information management system 103 determines a sequence of information management states that are going to be collected and analyzed. As discussed above, these states may be active or inactive states. The sequence may be determined for all the processes involved in information management over a period of time, or for a subset of processes with specific characteristics. For example, a subset of processes with most activity during a certain period of time may be selected for the state transition statistics to be collected from. Also, the period of time during which the state transition statistics are collected may be selected based on various factors such as periods of time with highest number of requests, occasions that may lead to higher request rates, etc. In one embodiment, if a user of an online shopping information system loses connectivity while searching for a Christmas gift item, the information management system may compare the current state sequence with stored sample state sequences from other holiday periods in order to predict whether the partially collected fragments need to be preserved for recycling or can be discarded. For example if the user loses connectivity while searching for a Christmas gift in the month June, it is less likely for the user to repeat the request or for other users to request similar information anytime soon. However, if the request has been submitted in December, the information management system may act differently and preserve information fragments after requesting user loses connectivity.

The shape of intelligent information management process is based on fluctuation between stable and unstable states by means of adaptation mechanism in any dynamic systems. Thus, the intelligent information management process evolution is considered as a kind of stochastic self-organization. This approach represents an information management process as a regular periodic motion of a dynamic system. Thus, the corresponding information management process state is interpreted as a state of a dynamic process in terms of regular and stochastic motion.

In step 505, the information recycling controller 115 calculates a state trajectory for each one of the information management processes based on the collected sequence of past states. By extending the definitions of the states, the intelligent information management process is represented as a particular model that follows a certain type of state trajectory (or attractor) in a multidimensional state space that is sampled by means of stable and unstable states. An attractor is a set to which a dynamic system evolves after a long enough time. That is, points that get close enough to the attractor remain close even if slightly disturbed. A trajectory of the dynamical system in the attractor does not have to satisfy any special constraints except for remaining on the attractor.

An information space can be considered as aggregated information set from different sources. This multi-sourcing consideration is very flexible since it accounts that the same piece of information can come from different sources. Such information can be serialized by means of several formats, for example Resource Description Framework (RDF).

The information can be perceived, aggregated and processed at different levels, starting from low-level signal-like representation up to high abstraction level of what can be captured and serialized through descriptive formats and beyond. However natural limitations are applied to any of the operations within that domain.

In step 507, the information recycling controller 115 predicts a finite set of possible future states based on the calculated state trajectory. It is known that the usage of mapped state space to explore and analyze the properties which are incomputable in the original, given, state space, creates the possibilities to find the directly mapped state space which can give qualitative properties of how to maintain and analyze the initially given information. Thus, in order to define the procedure of mapping two information state spaces should be taken into account. The first is RDF and the second is data signatures. These two state space representations create efficient framework for information fragments recycling and provisioning of the information sets.

In step 509, the information recycling controller 115 determines the recyclable information fragments based on the future state prediction. Overall prediction process constitutes of observing sequences of the most recent state trajectory (attractor). The trajectory defines a finite set of possible future states at given point in the (nearest) future. This knowledge is then leveraged in controlling the process management and determining the optimal working parameters, including information fragments, for the process. The set of possible future states can be further reduced by observing the history of the applied rules or information fragments and by trying to extract patterns in the sequences. Predicting the future impacts (from information consumers and providers) to the system significantly improves the accuracy of the state trajectory (attractor) prediction, and therefore, improves overall utilization (and recycling) of any fragments of information.

As per step 511 the information recycling controlled 115 preserves the recyclable information fragments for subsequent use. From the information management point of view, it means that all consumption/allocation that would be necessary to undertake to translate the information closure into any potential demanded form or recombine some new form for the current needs would be seamlessly provided as a native feature of such information management process. From the information management process point of view, the information management process state (e.g. conditions) would be possible to determine. These information management process states may be states such as inference actions, conceptual clustering, analogy creation or working conditions, fault prediction, usage pattern and workload estimation. The matter would be the right representation model of such information management process.

Having analyzed the potential outcome, the approach discussed can provide unified representation of information management process models that could accommodate different grains of information with different types of relationships. Such information management processes can reflect an information closure it can handle and, concurrently, such content can reflect information management process it can reside in.

Figure 6:
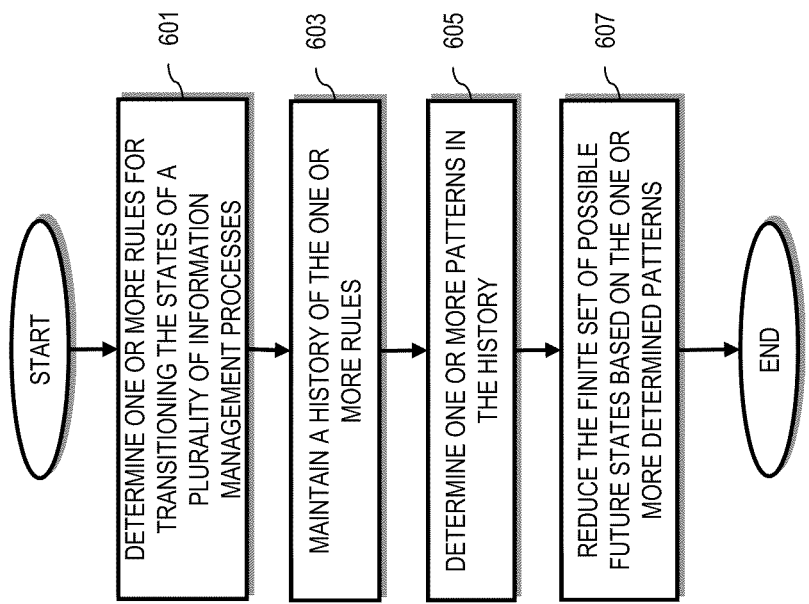
FIG. 6 is a flowchart of a process for determining a finite set of future states for information management processes, according to one embodiment.

FIG. 6 is a flowchart of a process for determining a finite set of future states for information management processes, according to one embodiment. In one embodiment, the information management system 103 performs the process 600 and is implemented in, for instance, a chip set including a processor and a memory as shown FIG. 8. It is assumed that the transition between various states is initiated by means of applied rules such as regulatory rules, semantic rules, etc. These rules can represent any possible impact of any external entity that can utilize a particular intelligent information management process. Thus, at any moment it is possible to predict the state of whole information management process only by observing its corresponding model state space. As seen in FIG. 6, in step 601 the transition rules for information management processes are determined. These rules may be submitted by information users, equipment manufacturers, network administrators or any other information user. As per step 603, the information management system 103 stores a sequence of past state transitions for analysis and pattern recognition in transition trends. In step 605, the stored history is analyzed for transition patterns. These patterns, if found, can help in predicting possible future states. In step 607, the recognized patterns in the history of state transitions are used for reducing (optimizing) the future sequence of states that has been predicted using state trajectory.

By way of example, the UE 101 and the information management system 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The processes described herein for providing information fragments recycling in information spaces may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
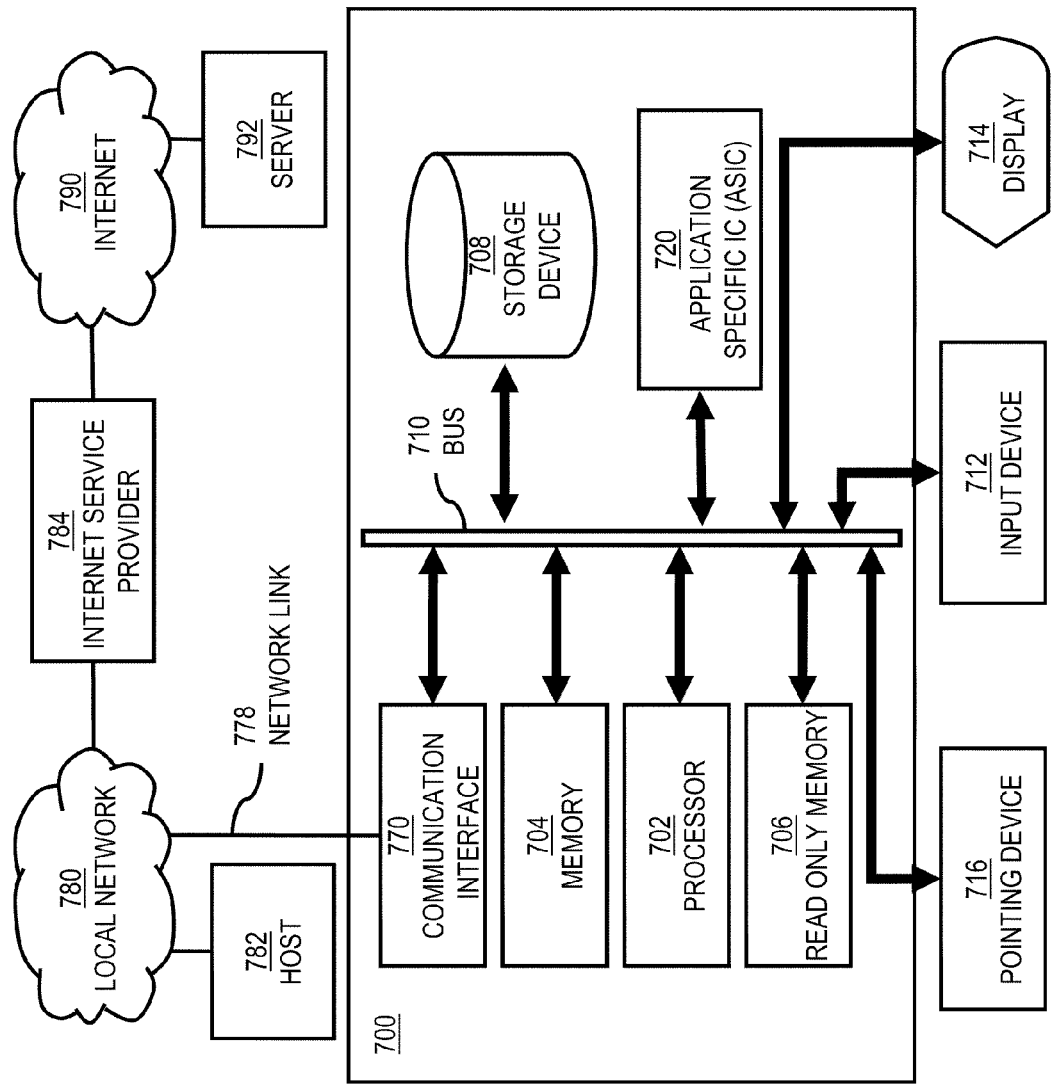
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to recycle information fragments in information spaces as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of information fragments recycling in information spaces.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to information fragments recycling in information spaces. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for information fragments recycling in information spaces. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for information fragments recycling in information spaces, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for recycling information fragments in response to a request by the UE 101.

The term "computer-readable medium" as used herein to refer to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
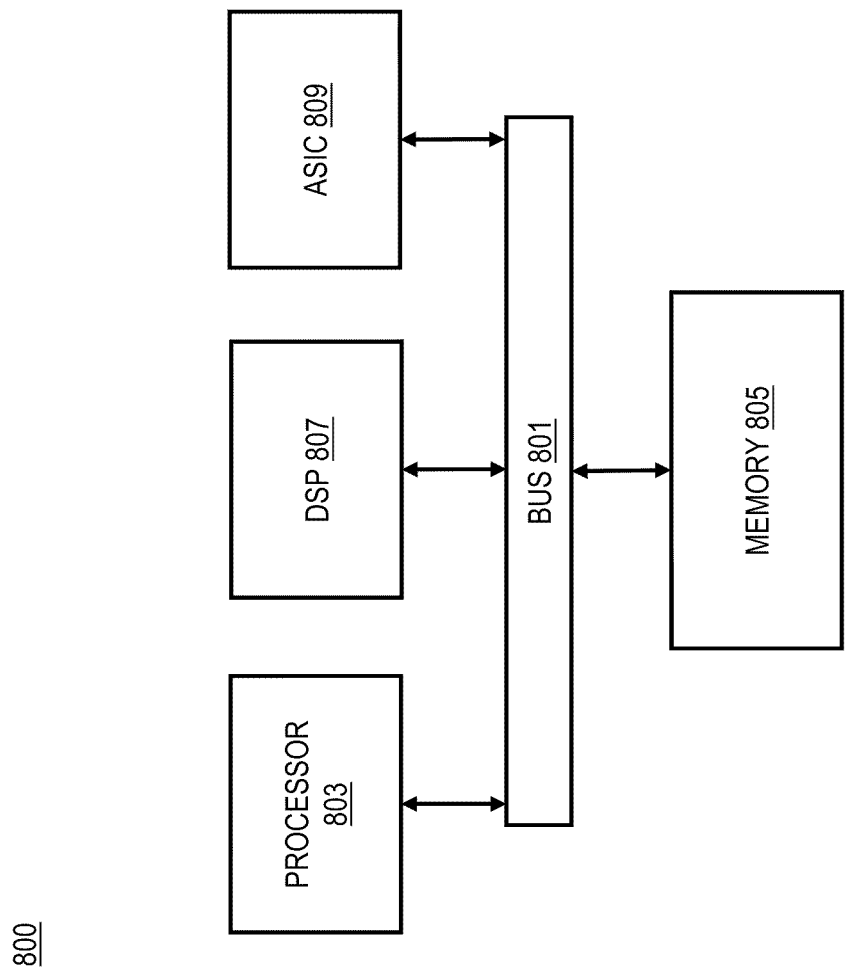
FIG. 8 is a diagram of a chip set that can be used to implement an embodiment of the invention.

FIG. 8 illustrates a chip set 800 upon which an embodiment of the invention may be implemented. Chip set 800 is programmed recycle to information fragments in information spaces as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of information fragments recycling in information spaces.

In one embodiment, the chip set 800 includes a communication mechanism such as a bus 801 for passing information among the components of the chip set 800. A processor 803 has connectivity to the bus 801 to execute instructions and process information stored in, for example, a memory 805.

The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to recycle information fragments in information spaces. The memory 805 also stores the data associated with or generated by the execution of the inventive steps.

Figure 9:
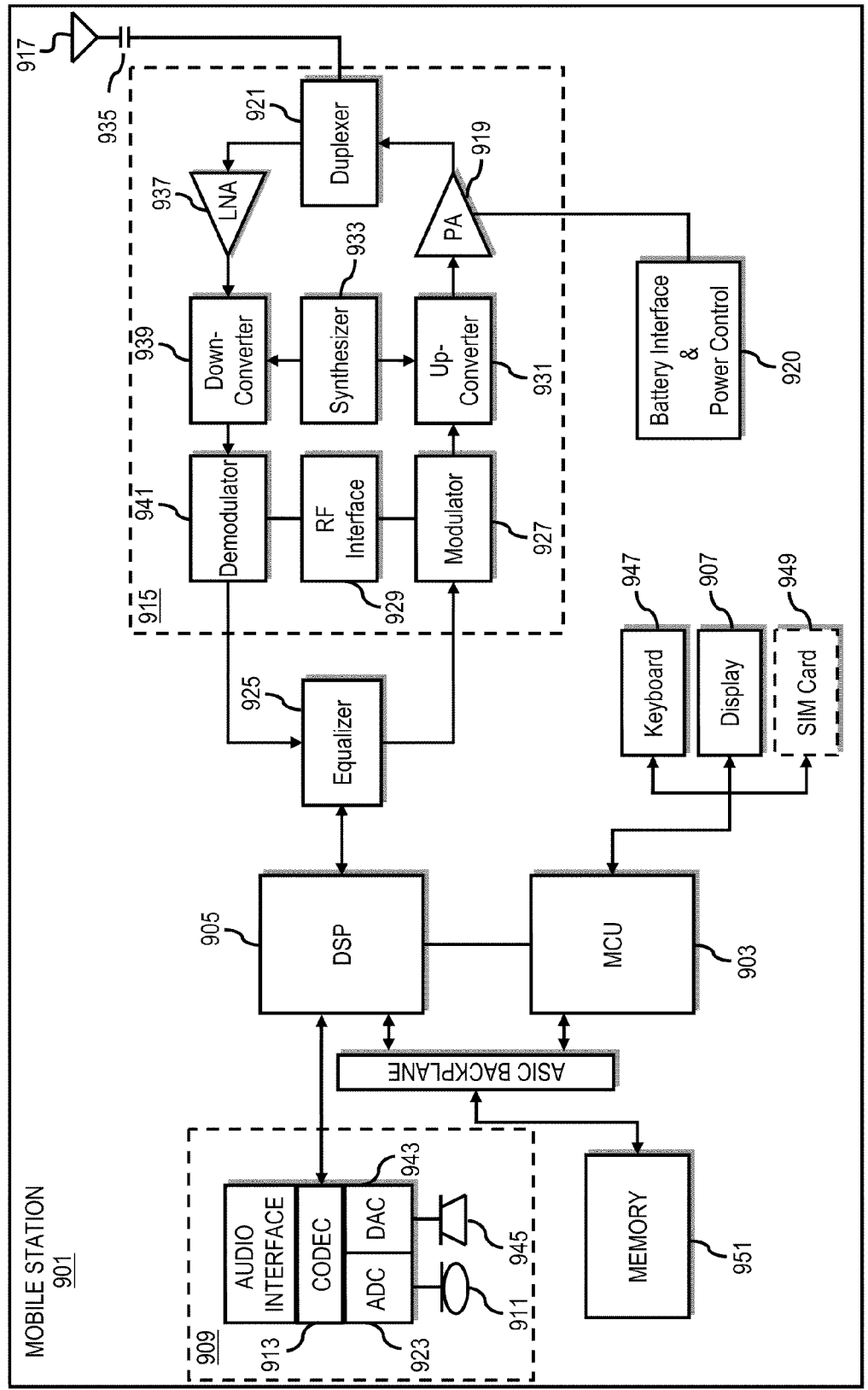
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of information fragments recycling in information spaces. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of information fragments recycling in information spaces. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to recycle information fragments in information spaces. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    detecting a plurality of information management processes occurring in an information space, wherein the information management processes retrieve one or more polynomial-based information fragments from the information space, wherein one or more of the information fragments were retrieved in response to a previous request directed to the information space, and the one or more of the information fragments are composed of irreducible polynomials of a plurality of degrees;
    determining a sequence of states for each of the plurality of information management processes over a period of time;

calculating a state trajectory based, at least in part, on each of the sequences of states;
predicting a finite set of possible future states based, at least in part, on the calculated state trajectories;
determining which of the one or more information fragments are recyclable based, at least in part, on the prediction; and
preserving the recyclable information fragments for responding to a subsequent request directed to the information space.

2. A method of claim 1, further comprising:
checking whether a requesting entity of the previous request is still available;
when the requesting entity becomes unavailable, terminating the response to the previous request; and
evaluating the retrieved information fragments for recyclability.

3. A method of claim 1, further comprising:
maintaining a history of the retrieved information fragments;
determining one or more patterns in the history; and
reducing the finite set of possible future states based, at least in part, on the one or more determined patterns, thereby determining which of the one or more information fragments are recyclable.

4. A method of claim 1, further comprising:
determining one or more rules for transitioning the states of the plurality of information management processes;
maintaining a history of the one or more rules;
determining one or more patterns in the history; and
reducing the finite set of possible future states based, at least in part, on the one or more determined patterns.

5. A method of claim 1, further comprising:
determining one or more working parameters for one or more of the information management processes based, at least in part, on the calculated state trajectories.

6. A method of claim 1, wherein the sequences of states are determined by conceptual clustering, analogy creation, fault prediction, usage pattern, workload estimation, or a combination thereof.

7. A method of claim 1, further comprising:
checking recyclability per information fragment for relevant one of the one or more information management processes until at least one of the relevant information management processes are determined as likely to reutilize the information fragment,
wherein the state includes an active state, an inactive state, or a transitional state.

8. An apparatus comprising:
at least one processor; and
at least one memory including computer program code,
the at least one memory and the computer program code configured to, with the at least one processor, cause the apparatus to perform at least the following,
detect a plurality of information management processes occurring in an information space, wherein the information management processes retrieve one or more polynomial-based information fragments from the information space, wherein one or more of the information fragments were retrieved in response to a previous request directed to the information space, and the one or more of the information fragments are composed of irreducible polynomials of a plurality of degrees,
determine a sequence of states for each of the plurality of information management processes over a period of time,
calculate a state trajectory based, at least in part, on each of the sequences of states,
predict a finite set of possible future states based, at least in part, on the calculated state trajectories;
determine which of the one or more information fragments are recyclable based, at least in part, on the prediction, and
preserve the recyclable information fragments for responding to a subsequent request directed to the information space.

9. An apparatus of claim 8, wherein a response to the previous request was not completed.

10. An apparatus of claim 8, wherein the apparatus is further caused to:
maintain a history of the retrieved information fragments;
determine one or more patterns in the history; and
reduce the finite set of possible future states based, at least in part, on the one or more determined patterns.

11. An apparatus of claim 8, wherein the apparatus is further caused to:
determine one or more rules for transitioning the states of the plurality of information management processes;
maintain a history of the one or more rules;
determine one or more patterns in the history; and
reduce the finite set of possible future states based, at least in part, on the one or more determined patterns.

12. An apparatus of claim 8, wherein the apparatus is further caused to:
determine one or more working parameters for one or more of the information management processes based, at least in part, on the calculated state trajectories.

13. An apparatus of claim 8, wherein the sequences of states are determined by conceptual clustering, analogy creation, fault prediction, usage pattern, workload estimation, or a combination thereof.

14. An apparatus of claim 8, wherein the state includes an active state, an inactive state, or a transitional state.

15. A non-transitory computer-readable storage medium carrying one or more sequences of one or more instructions which, when executed by one or more processors, cause an apparatus to at least perform the following steps:
detecting a plurality of information management processes occurring in an information space, wherein the information management processes retrieve one or more polynomial-based information fragments from the information space, wherein one or more of the information fragments were retrieved in response to a previous request directed to the information space, and the one or more of the information fragments are composed of irreducible polynomials of a plurality of degrees;
determining a sequence of states for each of the plurality of information management processes over a period of time;
calculating a state trajectory based, at least in part, each of the sequences of states;
predicting a finite set of possible future states based, at least in part, on the calculated state trajectories;
determining which of the one or more information fragments are recyclable based, at least in part, on the prediction; and
preserving the recyclable information fragments for responding to a subsequent request directed to the information space.

16. A non-transitory computer readable storage medium of claim 15, wherein the apparatus is further caused to perform:
maintaining a history of the retrieved information fragments;

determining one or more patterns in the history; and
reducing the finite set of possible future states based, at least in part, on the one or more determined patterns.

17. A non-transitory computer readable storage medium of claim 15, wherein the apparatus is further caused to perform:
determining one or more rules for transitioning the states of the plurality of information management processes;
maintaining a history of the one or more rules;
determining one or more patterns in the history; and
reducing the finite set of possible future states based, at least in part, on the one or more determined patterns.

18. A non-transitory computer readable storage medium of claim 15, wherein the apparatus is further caused to perform:
determining one or more working parameters for one or more of the information management processes based, at least in part, on the calculated state trajectories.

* * * * *